J. A. MATHIEU.
SEPARATING AND COLLECTING THE COMPONENT SUBSTANCES IN ANIMAL AND VEGETABLE MATTER.
No. 276,256. Patented Apr. 24, 1883.
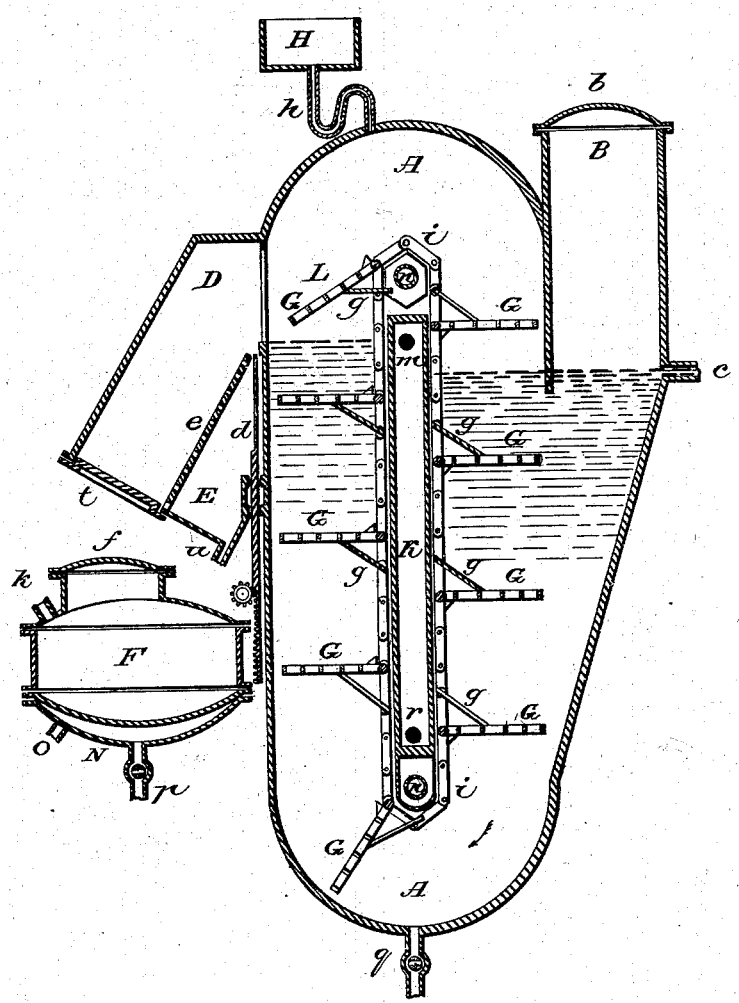

UNITED STATES PATENT OFFICE.

JEAN A. MATHIEU, OF PHILADELPHIA, PENNSYLVANIA.

SEPARATING AND COLLECTING THE COMPONENT SUBSTANCES IN ANIMAL AND VEGETABLE MATTER.

SPECIFICATION forming part of Letters Patent No. 276,256, dated April 24, 1883.

Application filed January 20, 1879.

*To all whom it may concern:*

Be it known that I, JEAN ANTOINE MATHIEU, of the city and county of Philadelphia, in the State of Pennsylvania, have invented a certain new and useful process for the manufacture of gelatine or glue from hides, animal-flesh, or from fish, and also an improved apparatus to be used in connection therewith; and I declare the following to be a specification thereof, reference being had to the accompanying drawing.

The said drawing represents a vertical section through the center of my apparatus.

A closed vessel, A A, preferably of cast-iron, is constructed of the form shown, and provided with necks B and D, closed respectively by lids *b* and *t*. The under side of the neck D is perforated by small holes, as shown at *e*, which communicate with a subjacent compartment, E, having an outlet-pipe at *u*. Within the vessel A is a closed rectangular compartment, K, having pipes *m* and *r* for the entry and exit of steam, shelves G G, formed of gratings arranged upon an endless chain, *i i*, which revolves around the compartment K, being actuated by the pinions *n n*. These shelves are pivoted so as to turn in a direction opposite to that of their movement, which latter is indicated by the arrow. The supports *g g*, however, slide upon the surface of the compartment K, prevent them from turning except when at the point indicated at L, when the movement of the shelf is prolonged beyond the end of the compartment K, and consequently the support *g* has no bearing. The vessel A has exit-pipes at *c* and *q*, provided with cocks, and at the top communicates by a trapped pipe, *h*, with a tank, H.

A vacuum-boiler, F, heated by a steam-jacket, N, and communicating by a pipe, *k*, with a condenser, is arranged with its mouth beneath the discharging end of the neck D. The opening between the vessel A and the neck D is closed by a sliding door or register, *d*, raised and lowered by a rack and pinion. The operation of the apparatus will be described in connection with the process to be used therewith, which has for its object primarily the elimination from the substance treated of its oily and watery and bony portions and the separation of the gelatine from the residue, and, secondarily, the economical recovery of the chemical agents used, as well as the preservation of the eliminated portions. The primary process consists in the subjection of the material to the successive action of solvents, accompanied by mechanical treatment, and the distillation of the gelatine from the residue.

I take the substances to be treated—such as fish, animal-flesh, or refuse hides—cut them into small pieces, and introduce them into the neck B of the vessel A. The latter is filled with methylic alcohol (the wood-spirit of commerce) to the level of the pipe *c*, and the substance to be treated is received by the shelves G and carried very slowly around until it reaches the opening in the neck D, when each shelf, as its support *g* passes the end of the compartment K, falls downward, as shown at *d*, and discharges its load into the neck D. Here a great portion of the liquid is drained off through the opening in the bottom *l*, and is caught in the receptacle E, whence it is withdrawn at *u*. The washed and drained substance is then discharged, by removing the lids *t* and *f*, into the vacuum-boiler F, when it is heated by the steam-jacket, and the remaining liquids are driven off through the pipe *k*. I prefer during the steeping in the vessel K to raise the temperature of the mass to about 120° Fahrenheit, and for this purpose steam is admitted through the pipe *m*. The time required for the first steeping varies, of course, with the percentage of fat or oil in the substance under treatment; but I have found that ordinarily at the temperature named about six hours give good results. The loss of liquid in the vessel A is supplied from the tank H. The material thus desiccated, which contains the gelatine, is then subjected to a second treatment in the same apparatus, (or in a similar and secondary one, if it is desired to maintain a continuous process,) which second treatment consists in steeping it in acetic acid while mechanically agitating it, as before, by means of which the osseous portions are dissolved. The excess of acid is then drained off, and the residue is heated in the vacuum-boiler F up to about 212° Fahrenheit, leaving the gelatine in proper condition for use. This completes the main or primary process of my invention.

The secondary processes have for their object the recovery of the solvents used as above and the conservation of the dissolved fats or oils. I take the methylic alcohol containing the fats in solution, and add thereto cold water until all the fats are precipitated. After settling, the aqueous solution of methylic alcohol is decanted off, filtered through charcoal, and redistilled at a low temperature, by which means the methylic alcohol is recovered in a condition fit for a repetition of the primary or gelatine process. The separated fats are then washed and preserved in any ordinary manner. The acetic-acid solutions remaining from the second stage of the main or gelatine process contain albumen and salts of lime. I treat these solutions with subacetate of lead, by means of which the albumen is precipitated, then filter the liquid residue through charcoal, and decompose the acetate of lime by any of the ordinary processes, thus recovering the acetic acid in a condition fit for use again in the gelatine process.

In the processes above described various equivalents for the solvents specified may be used—as, for instance, in place of dissolving the fats by means of methylic alcohol, the same result may be obtained by using acetone, and in place of dissolving the albuminous and osseous portions in acetic acid other organic acids—such as formic, oxalic, or proprionic—may be substituted as solvents.

I claim—

1. The process of separating gelatine from the substance specified by treating them with methylic alcohol, whereby the fatty portions are removed, and then treating the residue with acetic acid, whereby the albuminous and osseous portions are removed, substantially as specified.

2. The process of recovering methylic alcohol from combination with fatty matter by precipitating such fatty matters by means of cold water, and distilling the alcohol at a low temperature from the aqueous solution, substantially as specified.

3. The process of recovering acetic acid from its combination with albuminous and osseous matter by treating the compound with subacetate of lead, filtering the liquid residue through charcoal, and subsequently decomposing such residue, substantially as specified.

4. The combination of the vessel A, having necks B and D, with the endless chain $i$ and the pivoted shelves G, substantially as specified and shown.

JEAN ANTOINE MATHIEU.

Witnesses:
 JOS. C. FRALEY,
 F. F. HALLOWELL.